Patented Sept. 15, 1942

2,295,969

UNITED STATES PATENT OFFICE 2,295,969

PROCESS OF MAKING FLOOR COVERINGS

Paul O. Powers, Lancaster, Pa., assignor to Armstrong Cork Company, Lancaster, Pa., a corporation of Pennsylvania No Drawing. Application July 24, 1939,
Serial No. 286,078

1 Claim. (Cl. 117—76)

This invention relates generally to floor covering and more particularly to an asphalt impregnated felt base having a seal coat on the asphalt impregnated base and a print paint coat on top of the seal coat. The invention is concerned particularly with a process of making and applying a seal coat of urea-aldehyde resin to the asphalt impregnated base prior to applying the print paint coat.

In making floor coverings of this character which will be referred to hereinafter for purposes of conciseness as "felt base," a sheet of felt is impregnated by passing it through a bath of hot asphalt. In order to prevent the asphalt from bleeding through and staining the print paint coat, it is customary to apply a seal coat to the asphalt impregnated base before applying the print paint coat. A secondary function of the seal coat is to provide a smooth surface for printing. According to the present invention, urea aldehyde resins are employed for this seal coat.

Various characteristics are required, in order that the seal coat be satisfactory both from the standpoint of its application to the felt base and from the standpoint of utility after it has been applied.

(1) Viscosity of coating. The coating must be of proper consistency for satisfactory application to the felt base.

(2) Drying time. The seal coat must dry rapidly enough, so that when the asphalt impregnated felt with the seal coat applied thereto is rolled up it will not stick. In general, it may be stated that the seal coat must dry or cure within, say, 1½ or 2 minutes after it has been applied.

(3) The seal coat must give a seal in 1 or 2 coats, such that the print paint will not be stained by asphalt bleeding through.

(4) The seal coat should have good water resistance.

(5) The seal coat should have no undesirable effect on the print paint.

(6) The seal coat should be sufficiently stable that it will undergo no substantial change during the time it is in the coating bath.

It will be seen that the provision of a seal coat which meets all of these required characteristics in a satisfactory manner presents a difficult problem. I have found, however, that urea aldehyde seal coats are highly satisfactory for the purpose, provided the conditions hereinafter more fully described are followed.

The viscosity of the seal coat bath may be controlled in a number of ways, such as by variation in the amount of water present in the coating or variation in the reaction pH of the urea-aldehyde bath. Other variables remaining the same, the more acidic the batch the more viscous it is. The viscosity can be controlled further by addition of starch or other materials.

The urea-aldehyde seal coat bath is generally at a temperature of the order of about 140 to 150° F., while the asphalt impregnated sheet is being passed through it to apply the seal coat. It is necessary, of course, to prevent the resin bath from setting or curing even though the bath is maintained at this temperature for a considerable period of time. On the other hand, it is necessary that after the urea aldehyde seal coat has been applied to the felt base it cure rapidly, say within a period of one to two minutes, so that it will not stick when the felt base is coiled. I have found that these two conditions may be met by adjusting the pH of the seal coat bath, so that it is on the alkaline side of neutrality and by adding to the bath a salt of a volatile alkali and an acid radical which will not volatilize at the temperature at which the volatile alkali may be driven off. One such salt is ammonium phosphate. The alkalinity of the bath prevents it from setting while the seal coat is being applied. The asphalt impregnated felt base may be at a temperature of the order of about 190° F., when it is passed through the seal coat bath if it be applied at the point of saturation of the felt base material. The seal coat is thereby heated and since it is in the form of a film or coating after emersion from the bath, the ammonia of the ammonium phosphate evaporates. The acid radical, that is the phosphate radical in the case where ammonium phosphate is added to the bath, then becomes active and the urea aldehyde seal coat cures rapidly due to its lowered pH upon evaporation of the ammonia.

In place of ammonium phosphate as an accelerator for curing the urea aldehyde resin, I may employ any salt containing a volatile alkali and an acid radical. Suitable accelerators are zinc ammonium chloride, calcium ammonium chloride, ammonium lactate, ammonium tartrate and ammonium acetate. These accelerators are generally used in an amount between 0.1 and 0.2% based on the weight of the urea aldehyde resin solution.

Instead of first preparing the ammonium phosphate salt or other accelerator and then adding it to the urea aldehyde bath, I may form the salt in the bath by the addition of a volatile alkali and an acid. Thus I may form ammonium phosphate in the bath by adding phosphoric acid and ammonia to the bath. The other accelerators may be formed in the bath in a similar manner. In the claims where reference is made to "adding" an accelerator to the bath, it is intended to include either the actual addition to the bath of the preformed salt or the formation of the salt in the bath.

The reaction pH of the urea aldehyde resin bath has an important bearing on the character of the seal coat. In carrying out my process, I prefer to use a reaction pH between 4.0 and 6.8. If the pH is lower than about 4.0, that is the hydrogen ion concentration of the bath is high, the bath tends to be too viscous, its sealing properties are poorer and its flexibility is decreased. On the other hand, if the pH is above about 6.8, that is the hydrogen ion concentration is low, the seal coat tends to dry too slowly and it has poorer water resistance.

The ratio of aldehyde to urea used in forming the seal coat bath also affects the properties of the coat. I have found that the molar ratio of formaldehyde to urea should be between 1.3:1 and 2.0:1. Preferably the ratio is between 1.5:1 and 1.8:1. If a lower ratio of formaldehyde to urea than 1.3:1 is employed, the sealing power, water resistance and flexibility of the seal coat are decreased. On the other hand, if a ratio of formaldehyde to urea greater than 2.0:1 is employed, the seal coat tends to dry too slowly.

The invention may be carried out in the following manner. Urea and formalin (37% aqueous solution of formaldehyde) are mixed. If 19.8 gallons of the formalin are employed for 100 pounds of urea, the molar ratio of formaldehyde to urea will be 1.32:1. If 30 gallons of the formalin solution are used for 100 pounds of urea, the molar ratio of formaldehyde to urea will be 2.0:1. Proportions of urea and formaldehyde intermediate the amounts given may likewise be employed. The mixture of urea and formaldehyde is then adjusted to pH between 4.0 and 6.8, preferably between 6.0 and 6.5, depending upon the type of resin desired, and the mixture is heated to reaction temperature.

After condensation has taken place and the resin has been formed, the bath is adjusted to make it alkaline, preferably to a pH between 7 and 9. This adjustment of the bath insures that the bath will remain liquid during the application of the seal coat. An accelerator such as ammonium phosphate or any of the other accelerators referred to is then added to the bath and the seal coat of urea aldehyde resin is applied by passing the asphalt impregnated felt base through the seal coat bath. The seal coat bath is preferably at a temperature of about 150° F. and the seal coat may be applied when the asphalt is still hot. Upon emersion of the coated base from the seal coat bath, the ammonia or other volatile alkali portion of the accelerator evaporates and the acidity of the seal coat on the felt base increases, so that a rapid drying and cure of the seal coat is effected. The pH obtained on evaporation of ammonia is determined by the type of acid used in forming the ammonium salt used as an accelerator. If acetic acid is used, the final pH will be say around 5. If phosphoric acid is used, the pH will be say around 3. The urea aldehyde solution is stable as long as the pH is 7 or above. The rapidity of cure depends upon the acidity which develops when the ammonia evaporates, the cure being faster the greater the hydrogen ion concentration. That is, at pH 2 the resin cures quite rapidly.

If desired I may add starch, wheat flour or other starchy material to the urea and aldehyde. These materials are extenders of urea aldehyde resins and their addition enables a cheaper composition to be made with equivalent water resistance. They also serve to increase the viscosity of these resin solutions as prepared. However, they may be eliminated and the viscosity obtained by carrying the urea aldehyde reaction somewhat further. Up to two pounds of starch per pound of resin may be employed.

While the seal coating may be conveniently applied to the felt base material at the point where the felt base material is saturated with the asphalt composition and while the felt base material is therefore still hot, the invention is not limited to this procedure and the coating may be applied to the felt base material when it is cold, as for example, by a regular coating machine. The felt base material may then be carried through a heating stove and the seal coating cured in the heating stove where temperatures sufficient to quickly dry it are maintained and the material can be rolled after its passage through the curing chamber or stove.

I may increase the flexibility of the seal coat by adding plasticizers such as glycol, diethylene glycol and other polyhydroxy alcohols, such as sorbitol and mannitol.

Although the preferred materials for forming the seal coat are urea and formaldehyde, I may use derivatives of urea and may use aliphatic aldehydes other than formaldehyde in place of the formaldehyde.

The invention is not limited to the preferred procedure, which has been given merely for illustrative purposes, but may be otherwise embodied or practiced within the scope of the following claim.

I claim:

The process of seal coating an asphalt impregnated felt base material, which comprises condensing urea and an aldehyde in a molar ratio between 1.5:1 and 1.8:1 of aldehyde to urea at a pH between 6.0 and 6.5 in aqueous solution at an elevated temperature to form an aqueous bath of water soluble, urea aldehyde resin, adjusting the pH of the bath to approximately between 7 and 9, adding to the bath an ammonium salt, the acid radical of which has substantialy less volatility than said ammonium radical while maintaining the bath at a pH between 7 and 9, passing the asphalt impregnated felt base material while at a temperature of about 190° F. through said resin bath heated to a temperature of about 150° F., the heat of the felt base material causing decomposition of said salt and volatilization of said ammonium radical whereby the setting of the resin is accelerated by the acid radical.

PAUL O. POWERS.